Feb. 26, 1963   H. HILFIKER   3,078,784
COFFEE BREWING APPARATUS
Filed April 20, 1961
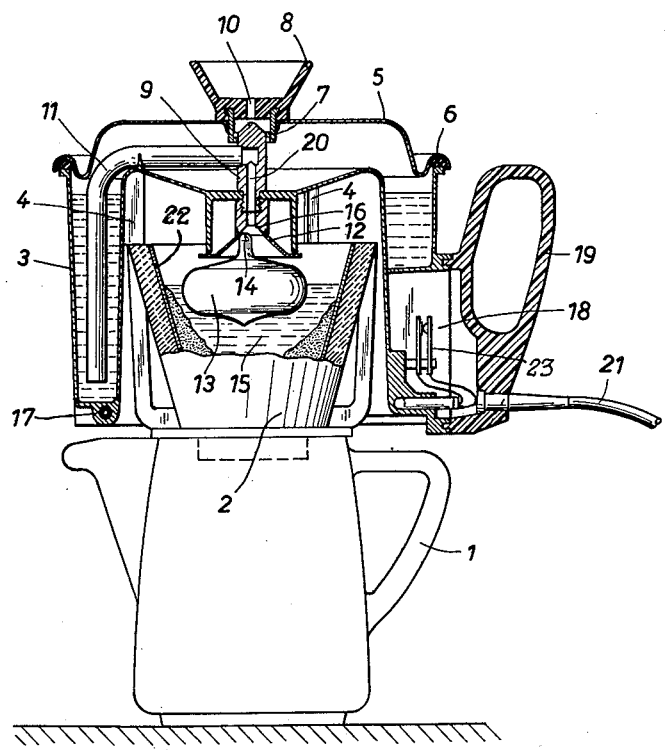
INVENTOR
HANS HILFIKER
By Wenderoth, Lind & Ponack
ATTORNEYS

United States Patent Office 3,078,784
Patented Feb. 26, 1963

3,078,784
COFFEE BREWING APPARATUS
Hans Hilfiker, Kilchberg, Zurich, Switzerland, assignor to Therma A.G., Schwanden, Glarus, Switzerland
Filed Apr. 20, 1961, Ser. No. 104,307
Claims priority, application Switzerland Apr. 29, 1960
8 Claims. (Cl. 99—282)

This invention relates to a coffee brewing apparatus which comprises a vessel for supplying hot water and a filter vessel having a float for the automatic control of the water level in the filter vessel, whereby, owing to a slight overpressure within the water vessel, the hot water therein is automatically urged out of the vessel and over the float regulating the water supply.

As an improvement of the apparatus described in my prior application Serial No. 860,937, the stability of the superposed vessels may be increased by lowering the centre of gravity of the hot water vessel. According to the invention, the vessel for preparing hot water is so arranged that when placed upon the filter vessel, it extends downwardly outside of and beyond the top of the filter vessel.

The hot water supply vessel suitably is formed hood-shaped, surrounding the top and side wall of the filter vessel, whereby the water is heated in the annular downwardly extending portion. Advantageously the aperture for vapour discharge, provided in the cover of the hot water supply vessel, is arranged so that it is located at a point remote of the water level. Boiling water is thus prevented from leaking through said aperture. The knob of the cover is formed so that it contains the opening for vapour discharge and is provided with a bayonet joint for securing the cover.

The counterpart of the bayonet joint is anchored in an upstanding column extending from the bottom of the vessel for hot water preparation and carrying a water supply duct, as communication means from the lowermost point of the vessel beyond the uppermost water level to the regulating member, said column is provided at its bottom end with a funnel-shaped water discharge opening which forms a valve seat for the regulating member and exerts a centering action upon the float.

According to a further development of the invention the float itself may be formed as valve body, in which case, for example, an upwardly extending bulged portion centrally arranged on the top of the float coacts with the valve seat. Due to its particular outside dimensions the float is roughly centered in the filter vessel.

Furthermore, a thermostat may be mounted in a recess of the hood-shaped water vessel, and this recess may be closed by the carrying handle of the vessel. The entire vessel thus will be constructed in waterproof manner.

The parts which require cleaning, thus the filter and the float, are easily accessible. By combining different functions to be effected by single components of the apparatus, a device results having a reduced number of parts capable of being produced at low cost.

The present invention will now be described in more detail with reference to the accompanying drawing illustrating, by way of example, a vertical sectional view of a preferred embodiment of the invention.

A ceramic coffee pot 1 supports a ceramic filter vessel 2 on the top of which is supported a water vessel 3 by means of the end faces of three ribs 4 provided on the vessel 3. A resiliently yielding cover 5 having a gasket 6 is secured by a bayonet joint 7 provided on a rotatable knob 8 against a counterpart 9 to tightly seal the vessel 3. The knob 8 is provided with a small vapour-discharge aperture 10 for limiting the vapour pressure. The column 9 consists of two parts which have screw threads that when engaged clamp the central portion of the vessel 3. The column 9 is anchored in the vessel 3 and carries a water tube 11. The column is also provided with a central duct 20 communicating with the tube 11 and provided at its bottom end with a funnel-shaped opening 12. A float 13 floating on the coffee water 15 has a bulged boss 14 coacting as valve with the water discharge opening 12.

The vessel 3 is provided with electric heating means 17, the heating current being controlled by means of a thermostat mounted in a recess 18 of the water vessel. The recess 18 is closed by a handle 19. The handle 19 is so formed that it closes the recess 18 containing the thermostat 23.

The preparation of coffee in the described device starts by filling water into the hot water preparing vessel 3. After the cover 5 has been closed by downwardly forcing and turning the knob 8, the electric supply cable 21 can be plugged in. Freshly ground coffee is then poured into a usual paper filter 22 provided within the filter vessel, the float 13 is inserted with the boss 14 at its top and the filter vessel 2 is put upon the coffee pot 1.

The vessel 3 can then be placed upon the filter vessel 2. Then the preparation of coffee proceeds automatically. The water heated by the heater 17 is brought to the boiling point. The vapour thereby developed generates pressure which is limited by the aperture 10 in the knob 8 and forces the hot water through the water tube 11 and the duct 20 over the float 13 and upon the coffee powder in the filter vessel 2. The steam reaches the aperture 10 by the clearances in the bayonet joint 7. The float then maintains a predetermined water level in the filter vessel and regulates the supply of hot water by closing and opening the water discharge opening 16 of the duct 20. As soon as all the water has been forced out of the vessel 3, the thermostat in the recess 18 automatically shuts off the current supply. When all the water has been forced out of the vessel 3 the temperature rises in the entire vessel including the recess 18. The thermostat 23 opens and breaks the current supply. After the vessel 3 and the filter vessel 2 have been removed, the coffee is available in the pot 1.

I claim:

1. A coffee brewing apparatus comprising a filter vessel to be placed on a coffee pot, a water vessel removably mounted on said filter vessel, means for heating water in said water vessel, tubular means extending between said water vessel and said filter vessel for supplying hot water from said water vessel to said filter vessel when said water is heated and steam pressure is built up above said water, a float positioned in said filter vessel controlling the supply of hot water through said tubular means to said filter vessel, said water vessel having a depending hollow annular skirt portion extending downwardly outside of and below the top of said filter vessel.

2. A coffee brewing apparatus according to claim 1, wherein an aperture for steam discharge is located in said water vessel above the water level in said water vessel.

3. A coffee brewing apparatus according to claim 2, wherein said water vessel comprises a removable cover having a knob in which said aperture is located for limiting the steam pressure generated in said water vessel.

4. A coffee brewing apparatus according to claim 3, wherein a column is mounted in the bottom of said water vessel and said knob is secured at the middle of said cover by a bayonet joint against said column whereby the edge of said cover is urged against the edge of said water vessel to provide a tight closure.

5. A coffee brewing apparatus according to claim 4, wherein said tubular means supplying hot water to the filter vessel opens into said column and is supported by the latter.

6. A coffee brewing apparatus according to claim 5, wherein said column has a water discharge opening of funnel shape serving as a valve seat for said float.

7. A coffee brewing apparatus, according to claim 6, wherein the top side of said float is provided in its centre with a bulged boss having a spherically curved top surface cooperating with said valve seat.

8. A coffee brewing apparatus according to claim 1, wherin said annular hollow skirt portion has a recess, a thermostat located in said recess and a handle for said water vessel closes said recess.

References Cited in the file of this patent
UNITED STATES PATENTS

| | | |
|---|---|---|
| 1,109,740 | Dehn | Sept. 8, 1914 |
| 1,706,190 | Shroyer | Mar. 19, 1929 |